United States Patent [19]

Halberstadt et al.

[11] 4,156,889

[45] May 29, 1979

[54] MIRROR LAMP

[75] Inventors: Alex L. Halberstadt; John C. Maddocks, both of London, England

[73] Assignee: Thorn Electrical Industries Limited, London, England

[21] Appl. No.: 832,817

[22] Filed: Sep. 13, 1977

[30] Foreign Application Priority Data

Sep. 16, 1976 [GB] United Kingdom ............... 38444/76

[51] Int. Cl.² ............................................... G03B 15/02

[52] U.S. Cl. ....................................... 362/16; 362/296; 362/347; 362/350

[58] Field of Search .................. 362/19, 296, 350, 347

[56] References Cited

U.S. PATENT DOCUMENTS 3,314,331 4/1967 Wiley .................................. 362/296

*Primary Examiner*—Stephen J. Lechert, Jr.

*Attorney, Agent, or Firm*—Robert F. O'Connell

[57] ABSTRACT

An improved electric mirror lamp comprising a concave mirror on the focus of which a light source, for example an incandescent filament is fixed, and the lamp also includes locating means by which its position in a lamp holder is determined and support means holding the mirror at a fixed position relative to the locating means. A support mirror is an integral moulded body having portions adapted to position the locating of the mirror. The locating means may be constituted by a locating ring secured to an end cap and the support means may include indentations which engage and retain the end cap. The electric light source or bulb may be replaceable and the mirror may be formed directly on an appropriate concave surface of the support means.

6 Claims, 3 Drawing Figures

MIRROR LAMP

The present invention relates to electric lamps, and in particular to lamps having a light source disposed at the focus of a concave mirror.

Such lamps are well known in the form of projection lamps having a filament disposed at the first focus of an ellipsoidal concave mirror, which are primarily used as the light source for 8 mm or 16 mm cine projectors, where the lamp is so position in the projector that the film gate is at or near the second focus of the mirror. The lamp must be accurately positioned relative to the gate and the projector optics when inserted into the projector lampholder, and to ensure this a slotted locating ring is soldered to the lamp cap which locates on pins in the lampholder. The position of this locating ring relative to the mirror is accurately fixed during manufacture of the lamp so that no further adjustment is needed once the lamp has been located in the lampholder.

In one such projector lamp a tungsten/halogen lamp bulb is mounted in an ellipsoidal aluminized mirror. This mirror is riveted to a metal bracket, which in turn is riveted to a ceramic insulator. To this insulator is fixed the metal cap carrying the locating ring. Connecting leads pass from behind the mirror through a ceramic insulator. These leads are then threaded through the centre of the bracket and its attached ceramic insulator and are soldered to the cap. Accurate positioning of the locating ring relative to the mirror is difficult in such a construction owing to the use of several parts riveted together, including ceramics which cannot be made to close tolerance. Manufacture of the lamp thus requires two separate alignment operations, one to fix the bulb with its filament at the mirror focus, and the other to fix the locating ring on the cap at the correct position relative to the mirror.

The lamp of this invention comprises a concave mirror, means for mounting an electric light source at a fixed position relative to the mirror, locating means for locating the lamp at a predetermined position in a lampholder, and support means holding the mirror at a fixed position relative to the locating means, wherein the support means is an integral moulded body having portions adapted to position the locating means and the mirror.

The light source may be fixed in the lamp or replaceable. It will usually be an incandescent bulb but may equally be a discharge device.

The provision of moulded portions to position both the mirror and the locating means avoids a separate alignment operation to fix the position of the locating means relative to the mirror. The locating means can be engaged by the portion concerned either directly, or indirectly through another component of the lamp, for example an end cap to which the locating means is secured.

A lamp constructed in accordance with the present invention will now be described by way of example, with reference to the accompanying drawings in which.

Figure 1:
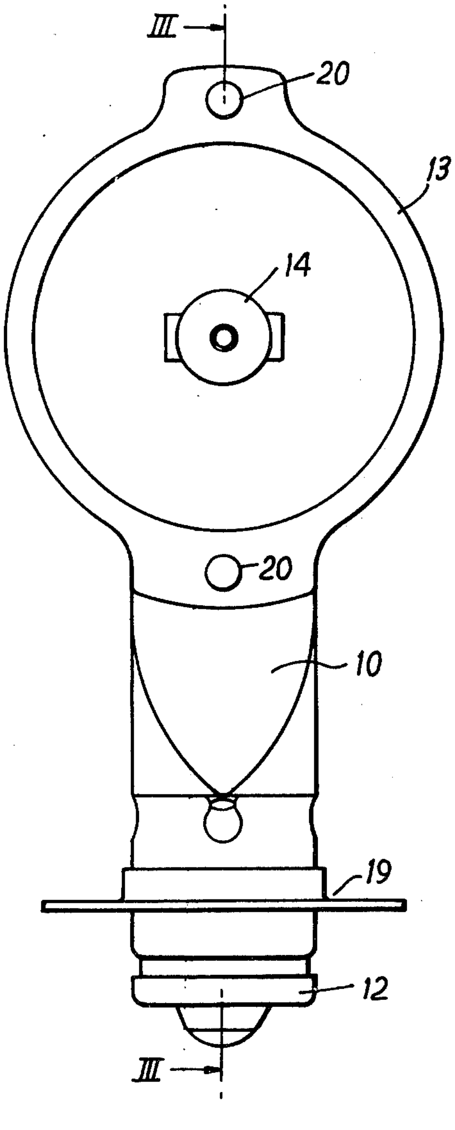
FIG. 1 is a front elevation of the lamp.
Figure 2:
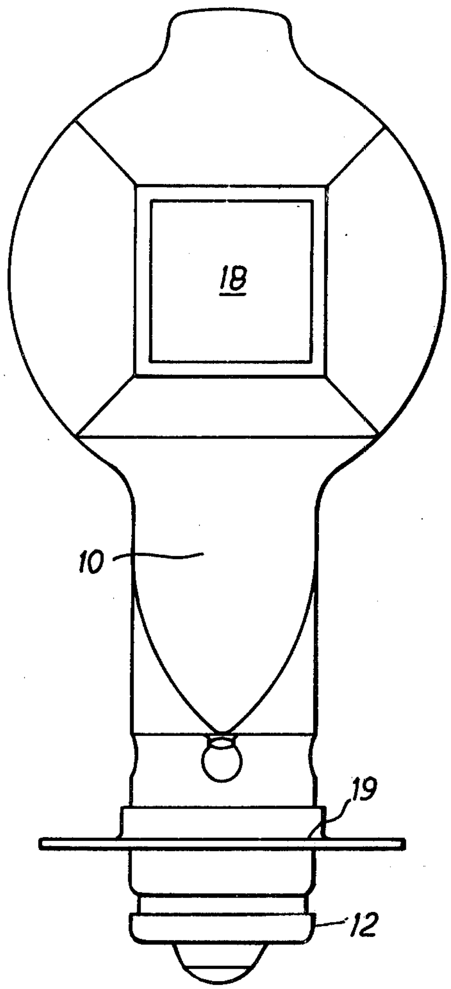
FIG. 2 is a rear elevation of the lamp.
Figure 3:
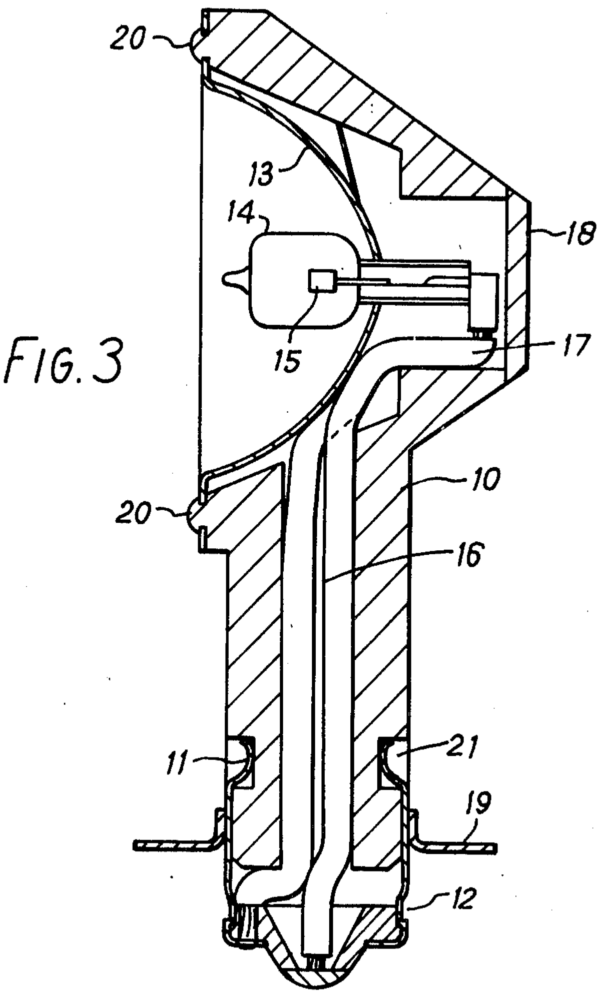
FIG. 3 is a sectional view taken on the line III—III of FIG. 1.

The lamp comprises a plastics moulding 10 serving as support means and having a metal end cap 12 secured on one end thereof and an aluminized ellipsoidal metal mirror 13 secured in a recess at the other end thereof. The mirror 13 carries a tungsten halogen lamp bulb 14 which is positioned so that its filament 15 is at the first focus of the mirror. A bore 16 is provided in the moulding 10 for wires 7 which connect the base of the bulb 14 to terminals in the end cap 12, and access to the bore may be provided through an opening closed by a rear plate 18. The end cap 12 carries a locating ring 19 which has slots (not shown) arranged to co-operate with locating pins in a suitable socket whereby the lamp can be accurately located with respect to the optical system of a projector.

The moulding 10 is produced to close tolerance with two accurately located studs 20 and spaced indentations 21 for receiving respectively the mirror 13 and end cap 12. Prior to assembly the locating ring 19 is accurately positioned on the end cap and soldered in place. Thus only one focussing or aligning operation is required, namely that of positioning the bulb in the mirror such that its filament is at the first focus. Once this is done the mirror is clicked over the two studs 20 and fastened by heating the studs and pressing them down on the mirror flange. The skirt of the end cap 12 can then be crimped accurately in position in the indentations 21, the leads 17 having been threaded through the bore 16 and welded, soldered or otherwise attached to the end cap terminals and bulb base. No further alignment is needed to ensure that the light is focussed correctly when the lamp is located in its socket.

In an alternative construction the prefocussed bulb and mirror combination is designed to be removably insertable into the moulding. The leads, end cap and locating ring are permanently secured to the moulding and the free ends of the leads remote from the end cap are capable of being pressed onto the terminals of the bulb before the bulb and mirror combination is inserted into its predetermined position in the moulding. Such a construction permits replacement of the bulb and mirror combination when the filament fails, instead of replacement of the whole lamp.

Various alternative methods can be used for securing the mirror and end cap to the moulding. For example, staking, glueing, welding or screwing. Also the leads 17 can be disposed outside the moulding and can be attached to the bulb and end cap terminals by any suitable means, for example, soldering, crimping or welding.

The mirror may be other than an ellipsoidal shape, if necessary for a particular application, and can be made from the moulding itself by metallizing the intended reflecting area, rather than as a separate component. In this construction the bulb can be aligned directly in the moulding.

I claim:

1. An electric lamp comprising a concave mirror, means for mounting an electric light source at a fixed position relative to the mirror, locating means for locating the lamp at a predetermined position in a lampholder, and support means holding the mirror at a fixed position relative to the locating means, wherein the support means is an integral moulded body having portions adapted to position the locating means and the mirror.

2. A lamp according to claim 1 wherein the locating means comprises a locating ring secured to an end cap on the support means.

3. A lamp according to claim 2 wherein the portion of the support means adapted to position the locating means comprises indentations which engage and retain the end cap.

4. A lamp according to claim 1 wherein the portion of the support means adapted to position the mirror comprises studs which engage and retain the mirror when mounted on the support means.

5. A lamp according to claim 1 wherein the mirror is formed directly on a concave surface of the support means.

6. A lamp according to claim 1 wherein the light the light source is an incandescent bulb having a filament at the focus of the mirror.

* * * * *